United States Patent
Ericson et al.

(10) Patent No.: US 11,250,406 B2
(45) Date of Patent: Feb. 15, 2022

(54) SPLIT TRANSACTION PHYSICAL PAYMENT INSTRUMENT

(71) Applicant: PayPal, Inc., San Jose, CA (US)

(72) Inventors: Braden Ericson, San Jose, CA (US); Chris Pickle, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 521 days.

(21) Appl. No.: 16/237,594

(22) Filed: Dec. 31, 2018

(65) Prior Publication Data

US 2020/0210984 A1 Jul. 2, 2020

(51) Int. Cl.
G06Q 20/22 (2012.01)
G06Q 20/40 (2012.01)
G06Q 20/20 (2012.01)
G06Q 20/34 (2012.01)
G06K 7/00 (2006.01)

(52) U.S. Cl.
CPC ......... *G06Q 20/227* (2013.01); *G06K 7/0013* (2013.01); *G06Q 20/204* (2013.01); *G06Q 20/353* (2013.01); *G06Q 20/405* (2013.01)

(58) Field of Classification Search
CPC .............................. G06K 7/04; G06K 7/0013
See application file for complete search history.

(56) References Cited

U.S. PATENT DOCUMENTS

| | | | | |
|---|---|---|---|---|
| 5,326,964 A | * | 7/1994 | Risser | G06K 13/063 235/486 |
| 8,408,463 B2 | * | 4/2013 | Narendra | G06Q 20/353 235/451 |
| 8,498,900 B1 | * | 7/2013 | Spirin | G06Q 20/14 705/15 |
| 8,762,211 B2 | * | 6/2014 | Killian | G06Q 20/3221 705/17 |
| 2006/0117017 A1 | * | 6/2006 | Kawaguchi | G06K 17/0022 |
| 2014/0025513 A1 | * | 1/2014 | Cooke | G06Q 20/20 705/17 |

* cited by examiner

*Primary Examiner* — Allen C Chein
(74) *Attorney, Agent, or Firm* — Haynes and Boone, LLP (57) ABSTRACT

Embodiments of systems and methods are provided for a split transaction payment instrument configured to automatically split transactions between a plurality of accounts. The split transaction payment instrument may interact with one or more other payment instruments. The split transaction payment instrument may, based on the interaction, accordingly identify that the transaction is a split transaction to a point of sale device and provide data identifying accounts associated with the split transaction payment instrument and the other payment instruments for splitting of the transaction. A service provider may receive transaction data associated with the transaction and process the transaction by accordingly splitting payment between the accounts.

20 Claims, 10 Drawing Sheets

SPLIT TRANSACTION PHYSICAL PAYMENT INSTRUMENT

TECHNICAL FIELD

Embodiments of the present disclosure generally relate to physical payment instruments, and more specifically, to physical payment instruments configured to allow automatic splitting of a single transaction between a plurality of payment instruments.

BACKGROUND

Customers are increasingly splitting transaction between a plurality of people. For example, when a group of people go out to lunch, the tab is often split between some or all members of the group. Transaction cards such as credit cards, debit cards and gift cards are widely used for these types of commerce and, in certain situations, one user may reimburse another user through an electronic payment account such as an account with Venmo® or PayPal®. However, such transactions are not always feasible as not all members of the group may have the proper device or web application to engage in the transaction.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure provide systems and methods for a physical split transaction payment instrument that allows for automatic splitting of a transaction. As such, a split transaction payment instrument described herein may interact with another split transaction payment instrument to cause automatic splitting of the transaction when the transaction is processed.

In various embodiments, the split transaction payment instrument may be a physical payment instrument. A first split transaction payment instrument may interact with another split transaction payment instrument during a transaction. The interaction may cause the transaction to be split, e.g., having the total payment amount of the transaction be processed beyond just a single payer, funding instrument, or account. In certain embodiments, the split transaction payment instrument may be a smart card. A second split transaction payment instrument may interact with the first split transaction payment instrument wirelessly or through a physical coupling. The first split transaction payment instrument may interact with a plurality of different split transaction payment instruments, splitting the amount of the transaction between accounts associated with each of the plurality of different split transaction payment instruments. Payment data provided through an interaction between the first split transaction payment instrument and a point of sale device may then identify the plurality of split transaction payment instruments and/or accounts for processing.

In certain embodiments, transaction data received by a service provider from a point of sale device may include data identifying the plurality of split transaction payment instruments and/or associated accounts. The service provider may identify the associated accounts and split the transactions accordingly over the associated accounts. Such accounts may be maintained by a plurality of account providers (e.g., payment services, creditors, banks, and other such entities) and the service provider may process (e.g., debit) the transaction by communicating with the plurality of account providers and identify the specific associated accounts and/or the amount to be debited to process the transaction.

In certain additional embodiments, the service provider may maintain a database of the transactions associated with each of the plurality of associated accounts. The service provider may utilize the data to provide and/or suggest services and/or advertisements that may be of interest to the user holding the account based on the payment history of the user maintained by the database. As such, though the user may not hold an account with the service provider, the service provider may nonetheless understand the payment history and tendencies of the user.

In an embodiment, authentication, authorization, and/or processing of payments utilizing a plurality of split transaction payment instruments may be conducted by a remote location server such as a payment service provider server, for example, implemented by PayPal®, Inc. or eBay®, Inc. of San Jose, Calif., USA.

Figure 1:
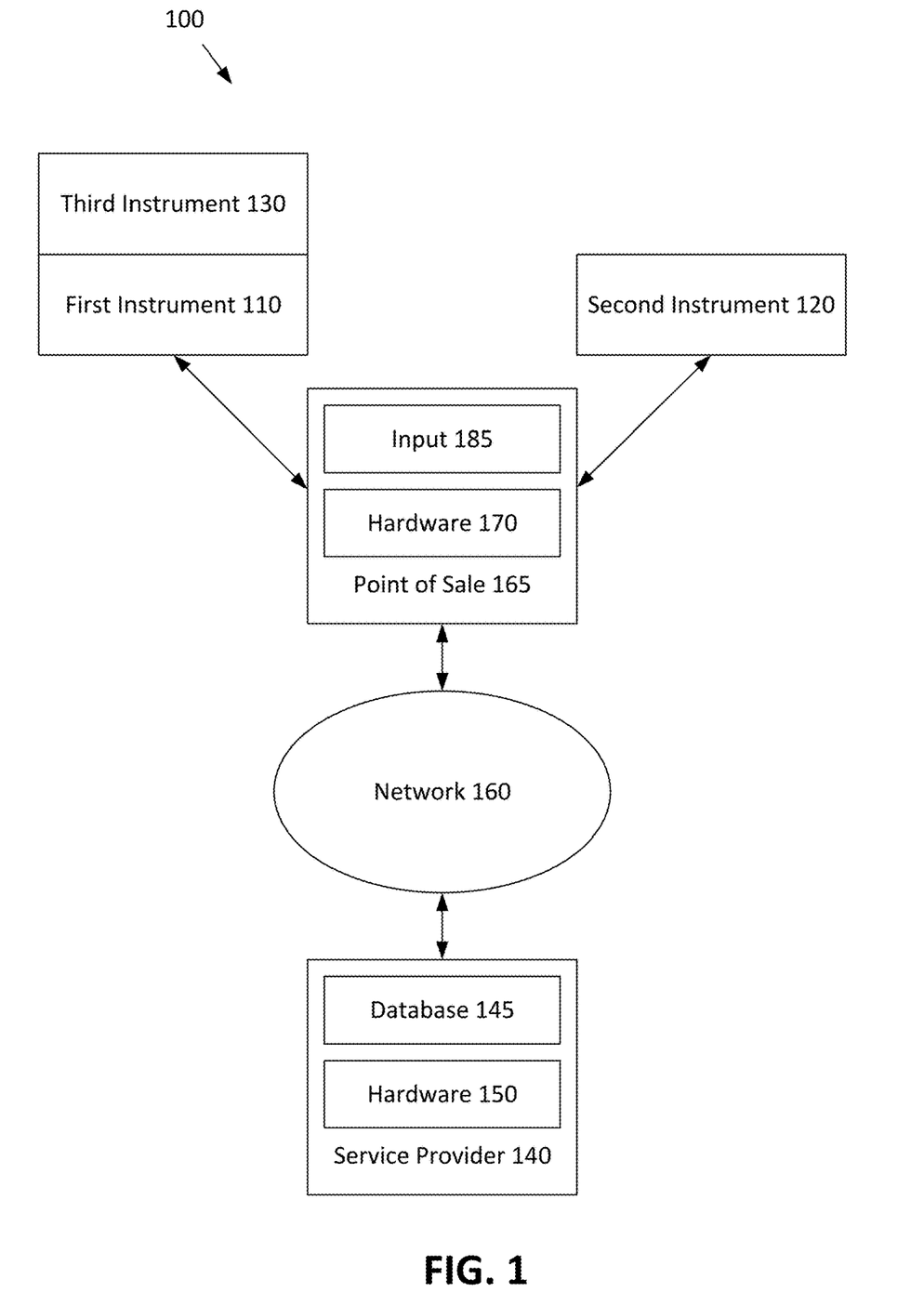
FIG. 1 is a diagram illustrating a system according to an embodiment of the present disclosure.

Referring now to the drawings wherein the showings are for purposes of illustrating embodiments of the present disclosure only, and not for purposes of limiting the same, FIG. 1 is a diagram illustrating a system according to an embodiment of the present disclosure. FIG. 1 illustrates a system 100 with a first instrument 110, a second instrument 120, a third instrument 130, a point of sale device 165, a network 160, and a service provider device 140.

First instrument 110, second instrument 120, and third instrument 130 may be split transaction payment instruments as described herein. Such split transaction payment instruments may be smart cards or other portable instruments. The split transaction payment instrument may include a transaction chip (e.g., an Europay, Mastercard, and Visa or EMV chip), a magnetic stripe, a processor, a memory, a wireless communications component for communicating in a short range communications standard such as Bluetooth, Near Field Communications (NFC), radio-frequency identification (RFID), or another communications standard, and a receptacle.

The receptacle may be configured to receive, engage, dock or otherwise engage, connect, and/or communicate with another split transaction payment instrument in a releasable manner. The receptacle may include hardware such as a docking mechanism that includes tabs, bumps, a clip, a clamp, a reader, or any other suitable engagement mechanism to provide a connection between another split transaction payment instrument. Thus, the receptacle may include a chip card reader to detect the EMV chip of another split transaction payment instrument and/or a magnetic stripe reader. Accordingly, a plurality of split transaction payment instruments may be engaged, as shown in the representation of the first instrument 110 and the third instrument 130, and at least one of the first instrument 110 and the third instrument 130 may detect the engagement of the instruments and cause automatic payment splitting of a transaction.

The wireless communications component may allow for a split transaction payment instrument to communicate with another split transaction payment instrument. Thus, for example, the first instrument 110 may detect the presence of and communicate with the second instrument 120 when the second instrument 120 is disposed proximate to the first instrument 110 (e.g., within the range of the wireless communications component). The first instrument 110 and/or the second instrument 120 may then accordingly cause automatic payment splitting of the transaction.

The split transaction payment instrument may also include one or more input devices or interfaces configured to receive inputs including instructions and/or authentication information from a user. The split transaction payment instrument may be of any suitable form factor including, for example, dimensions with a length, width, or thickness substantially similar (e.g., +/−5%) of a credit or debit card. In various embodiments, a split transaction payment instrument may include a readable code such as a barcode or a QR code and another split transaction payment instrument may scan the code to engage in split transactions.

The point of sale device 165 may include hardware 170 that includes one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. In one embodiment, the point of sale device 165 may be implemented as a checkout device, a personal computer (PC), a smart phone, laptop computer, a tablet, a wearable computing device, and/or other types of computing devices that includes hardware 170 capable of receiving user inputs and transmitting and/or receiving data (e.g., over network 160). Hardware 170 may include components to operate one or more user interfaces (e.g., touch screens, a mouse, a keyboard, and other input device) as well as processors, memory, screens, speakers, and other hardware devices that can be used to operate the point of sale device 165.

Input 185 of the point of sale device 165 may be configured to receive a payment instrument (e.g., a receptacle configured to receive a payment instrument). That is, a payment instrument (e.g., a split transaction payment instrument, credit card, debit card, or other type of instrument) may be inserted into the input 185. The point of sale device 165 may then detect the payment instrument, determine the identity of or receive data from the payment instrument, and communicate data to the service provider device 140 over the network 160 to process the transaction.

In certain embodiments, the point of sale device 165 may include other applications and/or hardware to perform other functions or provide other features. For example, such other applications and/or hardware may include security applications for implementing client-side security features, programmatic client applications for interfacing with appropriate application programming interfaces (APIs) over the network 160, or other types of applications. Such applications may also include applications that enable the merchant to communicate, transfer information, return payment, and otherwise conduct transactions through the service provider as described herein.

Network 160 may be implemented as a single network or a combination of multiple networks. For example, in various embodiments, the network 160 may include the Internet and/or one or more intranets, landline networks, wireless networks, and/or other appropriate types of networks.

The service provider device 140 may be maintained, for example, by a merchant or service provider offering various products and/or services (e.g., transaction or payment processing services). The service provider device 140 may include hardware 150, which may be configured to allow operation (e.g., by providing processing resources, cooling, and/or other performing other operations) of service provider device 140.

The service provider device 140 may also include a database 145 that stores data associated with transactions, accounts, and/or users associated with the service provider. In certain embodiments, the accounts may be user accounts maintained by the service provider (e.g., payment accounts). Such accounts may typically be accessed through electronic devices of the users. Database 145 may further include data associated with users that do not have accounts maintained by the service provider. Such users may have transactions (e.g., split payment transactions) that were processed by the service provider. Additionally, database 145 may store data directed to contact techniques for contacting other payment providers to process transactions.

In various embodiments of the present disclosure, execution of instruction sequences to practice the present disclosure may be performed by a networked system as described herein. In various other embodiments of the present disclosure, a plurality of computers and/or systems coupled by a communication link to the network (e.g., such as a LAN, WLAN, PTSN, and/or various other wired or wireless networks, including telecommunications, mobile, and cellular phone networks) may perform instruction sequences to practice the present disclosure in coordination with one another.

Figure 2A:
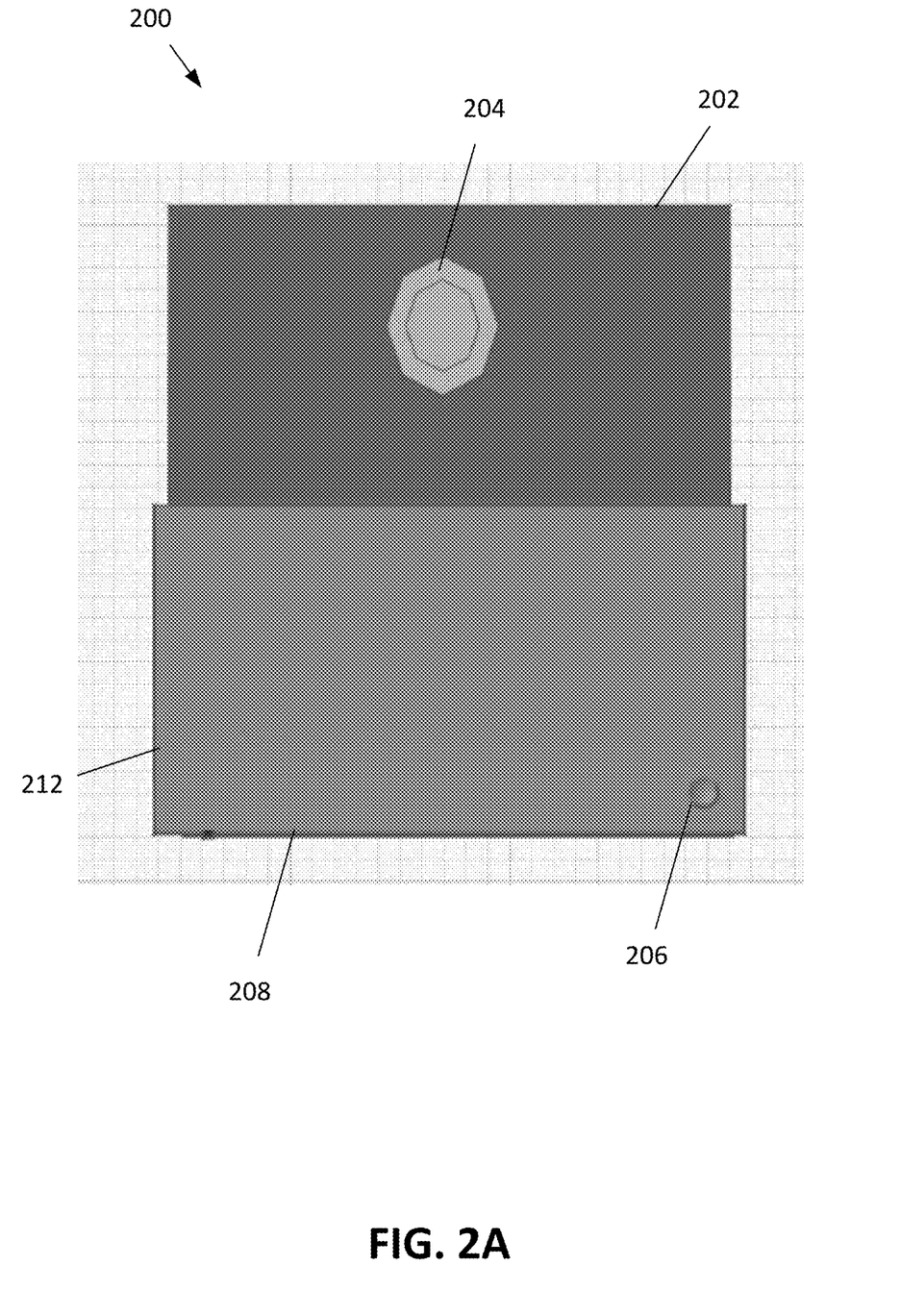
FIGS. 2A-C illustrate representations of a split transaction payment instrument according to an embodiment of the present disclosure.
Figure 2B:
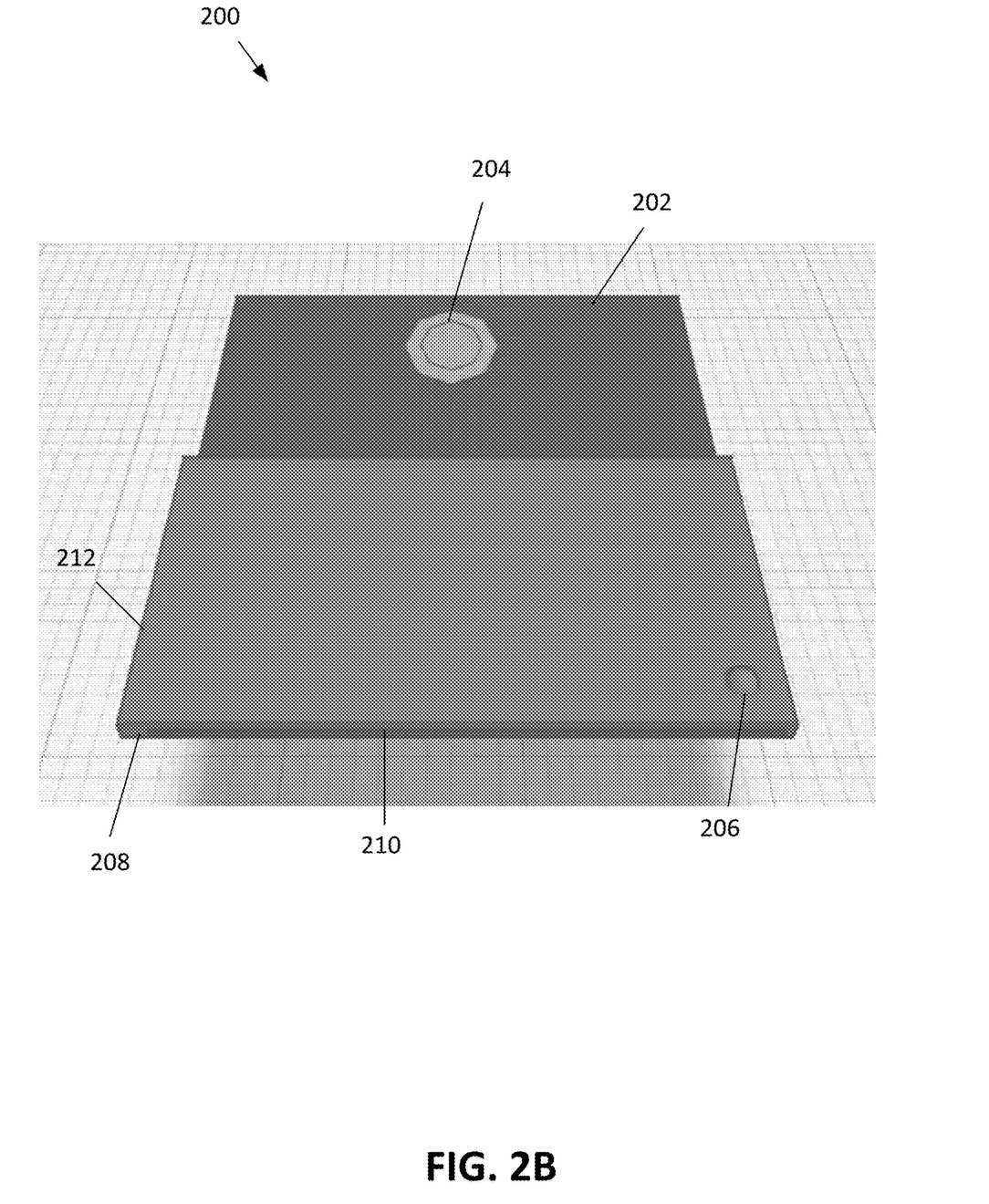
Figure 2C:
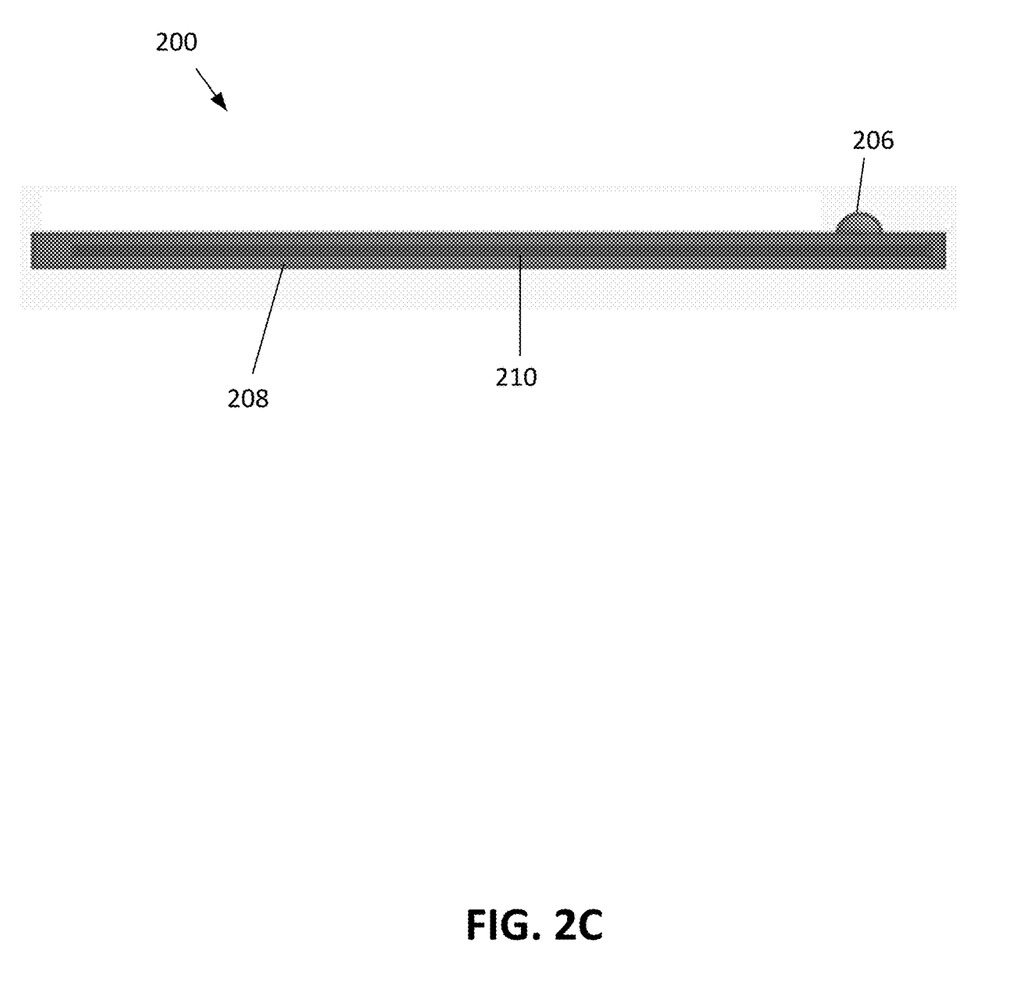

FIGS. 2A-C illustrate representations of a split transaction payment instrument 200 according to an embodiment of the present disclosure. FIGS. 2A-C illustrate split transaction payment instrument 200. Split transaction payment instrument 200 may include a first portion 202, a chip 204, an indicator 206, a second portion 208, a receptacle 210, and circuitry 212. For the purposes of the disclosure, the location of various components on the split transaction payment instruments described herein (e.g., chip 204 located on first portion 202) is only exemplary. Other embodiments of split transaction payment instrument may include components disposed, additionally or alternatively, on other portions. Split transaction payment instrument 100 may be a smart card or other portable instrument.

In certain embodiments, the split transaction payment instrument 200 may include distinct portions, such as first portion 202 and second portion 204. First portion 202 may be a width, length, and/or height suitable to be inserted into a receptacle of a merchant device and/or a receptacle of another split transaction payment instrument 200. Second portion 204 may be the same or different dimensions as first portion 202.

The chip 204 may be disposed within the first portion 202 and may be a chip for processing transactions. Credit and/or debit transactions may be carried out through the use of the chip 204 by, for example, electrically coupling the chip 204 with a merchant device (e.g., by inserting the split transaction payment instrument 200 into a chip receptacle of the merchant device). The chip 204 may be a transaction chip such as an EMV chip. Further embodiments of the split transaction payment instrument 200 may include a magnetic stripe for payment processing. The chip 204 may be, for example, a secure element associated with the split transaction payment instrument 200. The chip 204 may, thus, store sensitive data identifying the payment account associated with the split transaction payment instrument 200.

Various portions of the split transaction payment instrument 200 may include circuitry 212. Circuitry 212 may include one or more processors, memories, and other appropriate components for executing instructions such as program code and/or data stored on one or more computer readable mediums to implement the various applications, data, and methods described herein. The one or more processors may be one or more micro-controllers, digital signal processors (DSP), or other processing components. Components of circuitry 212 may also include a system memory component (e.g., RAM), a static storage component (e.g., ROM), and/or a disk drive 517. Logic may be encoded in a computer readable medium, which may refer to any medium that participates in providing instructions to processor(s) for execution. Such a medium may take many forms, including but not limited to, non-volatile media, volatile media, and transmission media. In one embodiment, the logic is encoded in non-transitory computer readable medium.

Circuitry 212 may also include communications circuitry. Communications circuitry may be adapted to communicate with one or more other split transaction payment instruments. Communications circuitry may be configured to provide and receive data over a short range communications standard such as microwave, radio frequency identification (RFID), infrared, Bluetooth, and Near Field Communications (NFC) standards. Thus, communications circuitry may allow split transaction payment instrument 200 to communicate directly with another nearby device or payment instrument.

Thus, circuitry 212 may be configured to detect when another split transaction payment instrument is coupled to the split transaction payment instrument 200 and/or disposed proximate the split transaction payment instrument 200. For example, circuitry 212 may be configured to detect when the other split transaction payment instrument is disposed within receptacle 210 and/or electrically coupled to one or more contacts disposed within the receptacle 210. Additionally, circuitry 212 may, through the communications circuitry, detect when another split transaction payment instrument is disposed proximate the split transaction payment instrument 200 by, for example, electrically communicating with the other split transaction payment instrument (e.g., through Bluetooth or NFC communications techniques).

Circuitry 212 may be configured to provide data to the chip 204 (e.g., to communicate to a coupled merchant device). In certain embodiments, the split transaction payment instrument 200 may according detect when one or more other split transaction payment instruments are directly or indirectly (e.g., through another payment instrument) coupled or proximately disposed. The split transaction payment instrument 200 may then provide data to chip 204 that identifies the coupled or proximately disposed payment instruments.

In certain embodiments, the data that identifies the coupled or proximately disposed payment instruments may include data directed to account numbers of the payment instruments. For example, where a traditional single instrument transaction may include data identifying the single instrument, data from the split transaction payment instrument 200 may include data identifying that 1) the transaction is a split transaction, 2) the number of payment instruments involved in the split transaction, and/or 3) the identity (e.g., account numbers or other identifying information) of the payment instruments within the transaction. Such data may be embedded within the data provided from the split transaction payment instrument 200 to the merchant device via the chip 204. The data may be configured to be translated or provided to the service provider. In certain embodiments, the data may be encrypted. In other embodiments, the data may be configured to be transmitted from the merchant device to the service provider. The data may be a format that the merchant device is not configured to modify.

Additionally, the split transaction payment instrument 200 may be associated or issued by the service provider and the data provided by the split transaction payment instrument 200 may be of a proprietary format for the service provider. Thus, for example, the split transaction payment instrument 200 may be issued by Venmo® and the data provided by the split transaction payment instrument 200 may be a Venmo® format data configured to be communicated to Venmo®. The data may indicate the service provider that the merchant device should communicate the data to. The service provider may then identify the issuers of the various payment instruments of the split transaction and the service provider may process the transaction with the issuers accordingly.

The receptacle 210 may be configured to receive another split transaction payment instrument. Thus, the receptacle 210 may be disposed within the second portion 208. As the receptacle 210 may be configured to at least partially enclose a first portion of another split transaction payment instrument, the second portion 208 may be of a larger dimension than first portion 208. While the embodiment shown in FIGS. 2A-C may fully enclose a first portion of another payment instrument with the receptacle 210 (e.g., the first portion may be inserted into the receptacle 210), other embodiments may only partially enclose the first portion of another instrument. Furthermore, when the current disclosure references the receptacle 210 coupling to the first portion of another split transaction payment instrument, it is appreciated that embodiments of the split transaction payment instrument 200 may also be coupled to receive a standard payment instrument (e.g., a standard credit, debit, or gift card) within the receptacle 210 and provide split transactions with the standard payment instrument in the same manner.

The indicator 206 may be a user interface that indicates whether the current transaction of the split transaction payment instrument 200 is a split transaction or a single payment instrument transaction. Thus, the indicator 206 may be a colored light emitting diode (LED) and different colors may illuminate for different types of transactions. In other embodiments, the indicator 206 may indicate the presence or absence of another split transaction payment instrument coupled to or proximate to the split transaction payment instrument 200. In further embodiments, the indicator 200 may be a display (e.g., LED or liquid crystal display), a speaker, and/or another type of interface configured to provide information to a user of the split transaction payment instrument 200.

Figure 3A:
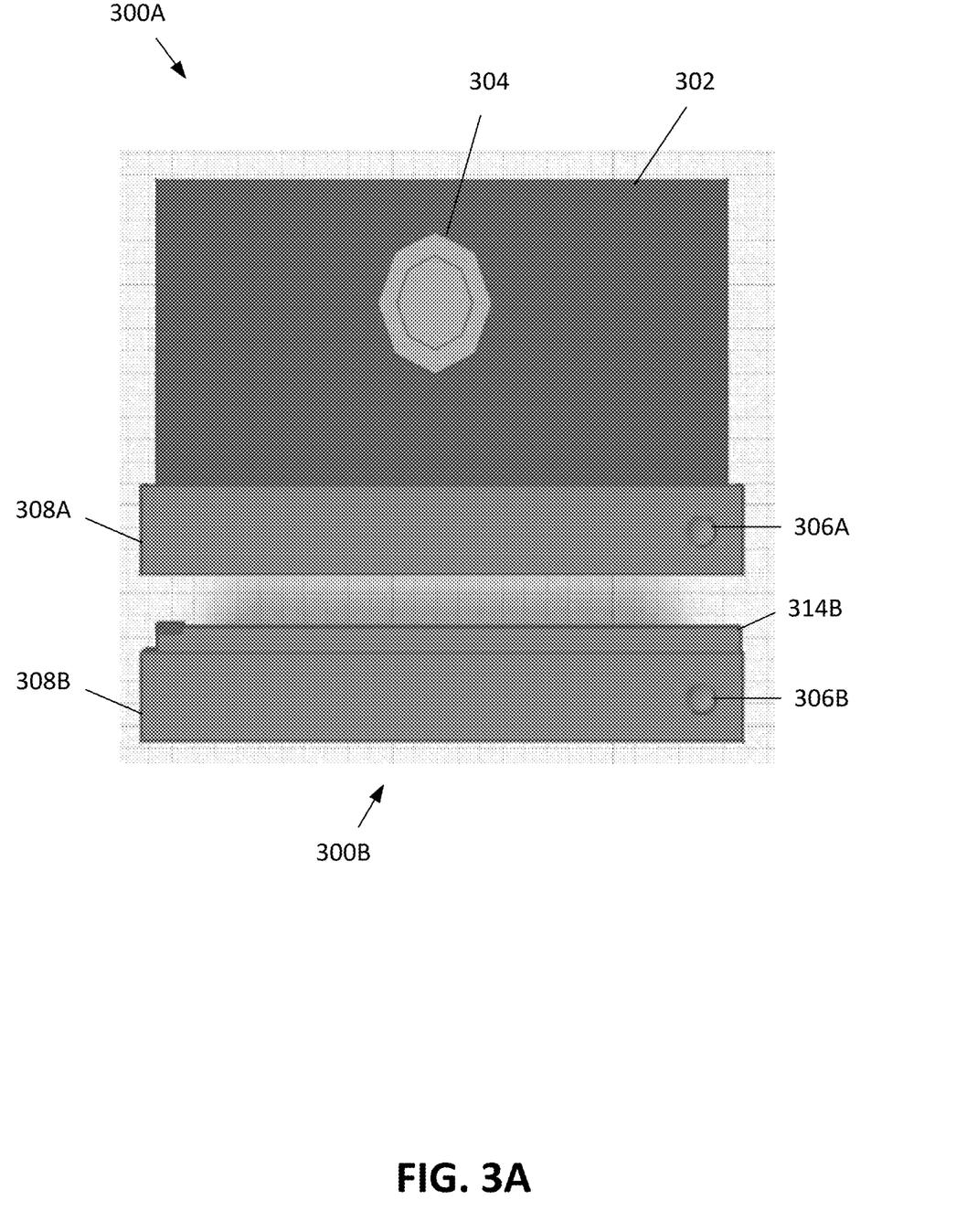
FIGS. 3A and 3B illustrate representations of another split transaction payment instrument according to an embodiment of the present disclosure.
Figure 3B:
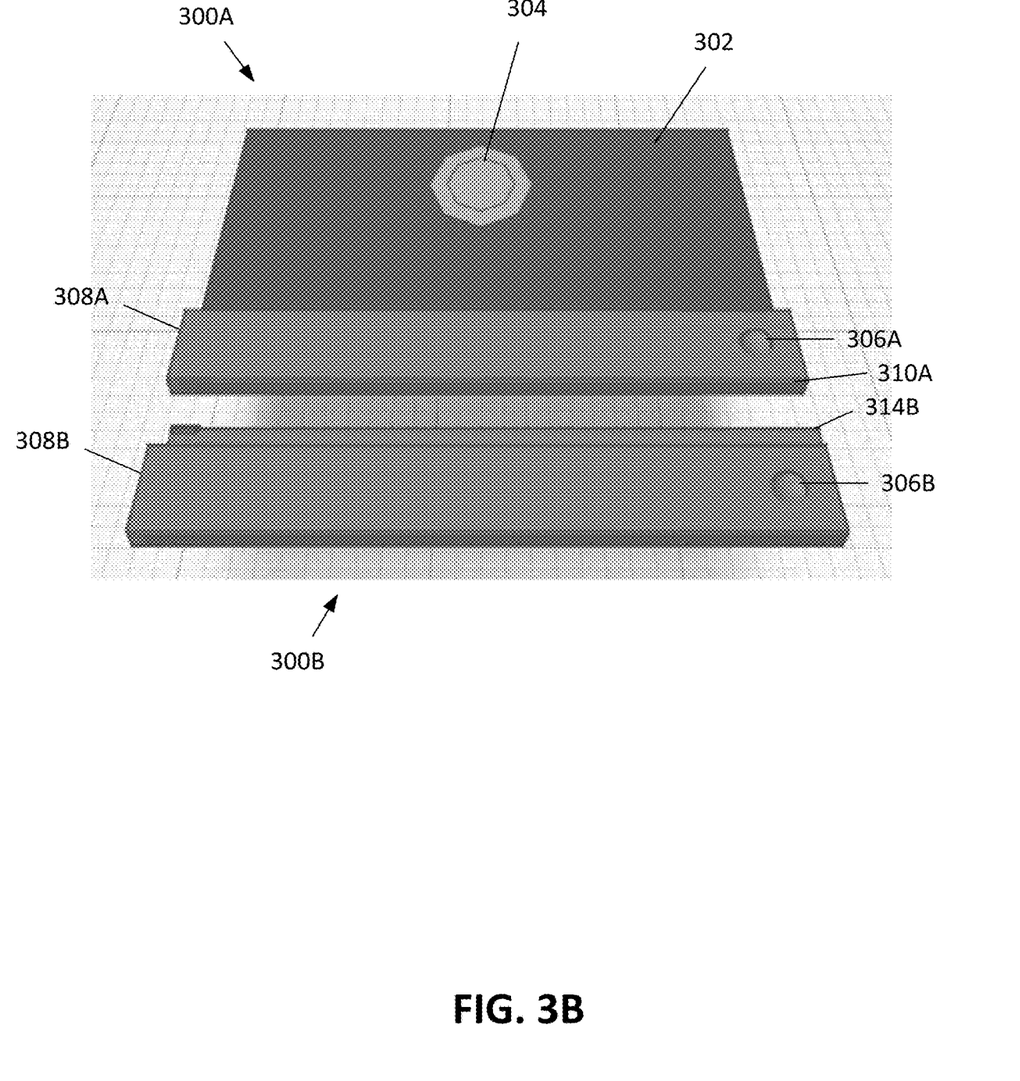

FIGS. 3A and 3B illustrate representations of another split transaction payment instrument 300 according to an embodiment of the present disclosure. FIGS. 3A and 3B illustrate split transaction payment instrument 300. Split transaction payment instrument 300 may be similar to split transaction payment instrument 200 of FIGS. 2A-C, though the second portion 308A of the split transaction payment instrument 300 may be detachable from the first portion 302. Accordingly, if a user of the split transaction payment instrument 300 wishes to participate in a split transaction, the user may detach the second portion 308A and couple the second portion 308A to another user's split transaction payment instrument.

Such a configuration is shown in FIGS. 3A and 3B. The second portion 308B of another split transaction payment instrument 300B is positioned proximate the split transaction payment instrument 300A to be coupled to the second portion 308A of another user. The second portion 308B may include a tab 314B. The tab 314B may be disposed on an end of the second portion 308B opposite the end that receptacle 310A is disposed within and may be configured to be inserted into the receptacle 310A.

When the tab 314B is inserted into the receptacle 310A, the second portion 308B may be coupled to the second portion 308A of the split transaction payment instrument 300A. Electrical contacts of the tab 314B and receptacle 310A may electrically connect and, for example, cause a change in resistance within the circuitry of the split transaction payment instrument 300A. The split transaction payment instrument 300A may accordingly determine that one or more second portions of other payment instruments are coupled to the split transaction payment instrument 300A. A plurality of different second portions may each be contacted to each other by disposing of their respective tabs into a receptacle and, thus, may be "stacked" onto the split transaction payment instrument 300A. Thus, the transaction may be split three or more ways by stacking various second portions onto the split transaction payment instrument 300A.

The split transaction payment instrument 300A may recognize that the second portion 308A is coupled to the second portion 308B and accordingly determine that transactions processed with the split transaction payment instrument 300A in such a configuration should be a split transaction. In certain embodiments, the second portion 308B may include a secure element (e.g., may include an EMV chip or a secure element embedded within circuitry of the second portion 308B). The second portion 308B may include circuitry and may be configured to provide a payment account associated with the split transaction payment instrument 300B. Accordingly, the split transaction payment instrument 300A may additionally determine that the transaction should be split with the payment account associated with the split transaction payment instrument 300B.

Thus, when the split transaction payment instrument 300A includes the second portion 308B coupled to the second portion 308A and is inserted into a merchant device (e.g., a point of sale payment processing device), the split transaction payment instrument 300A may provide transaction data that identifies the payment accounts associated with the split transaction payment instruments 300A and 300B. The merchant device may then provide data to the service provider identifying the transaction as a split transaction and identifying the payment instruments (e.g., the payment accounts associated with the split transaction payment instruments 300A and 300B) associated with the split transaction. The service provider may then process the transaction accordingly.

The indicators 306A and 306B may indicate when the second portion 308B is coupled to the second portion 308A. For example, the indicators 306A and 306B may be LEDs that illuminate in a first color to indicate when second portion 308B is coupled to the second portion 308A and, thus, communicate that any transaction processed with the split transaction payment instrument 300A would be a split transaction.

Figure 4A:
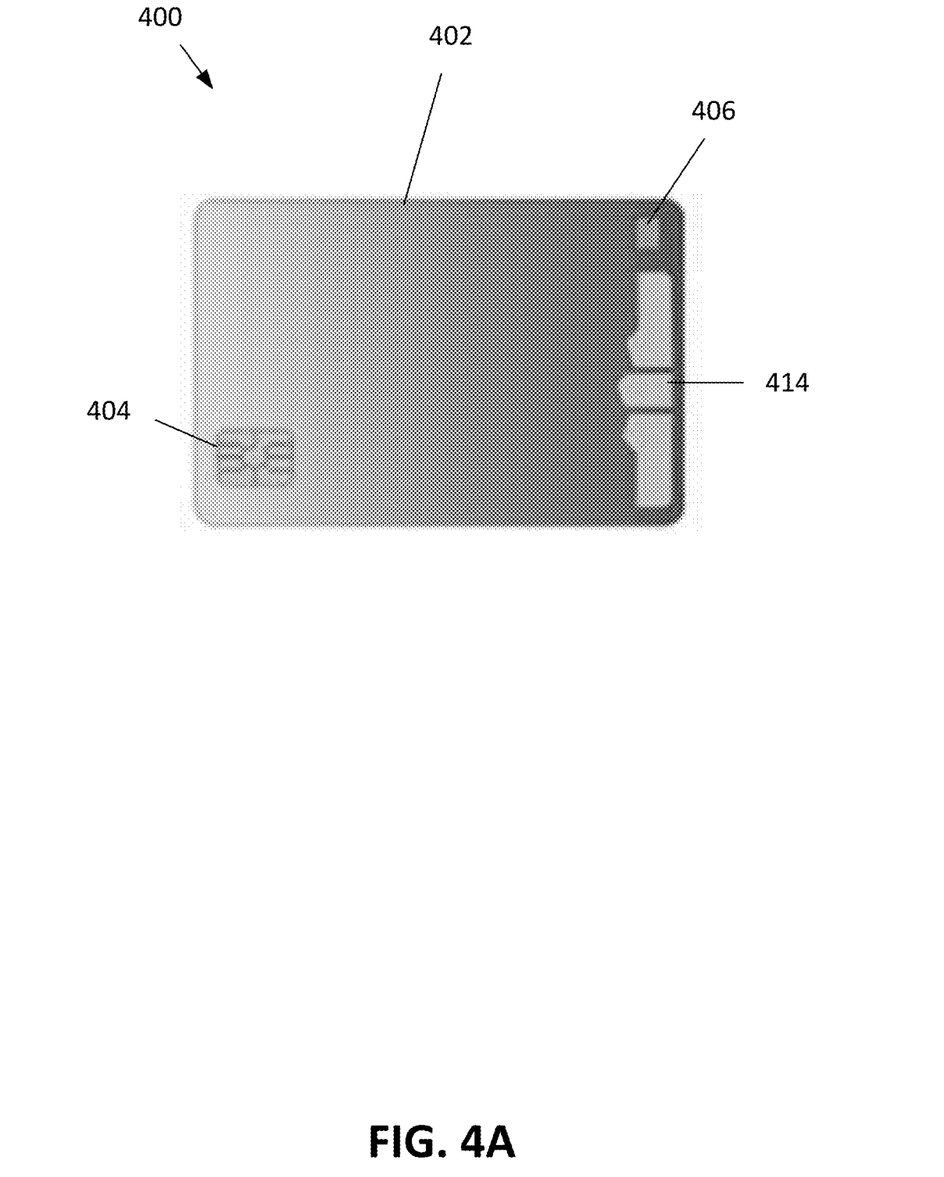
FIGS. 4A and 4B illustrate features of a split transaction payment instrument according to an embodiment of the present disclosure.
Figure 4B:
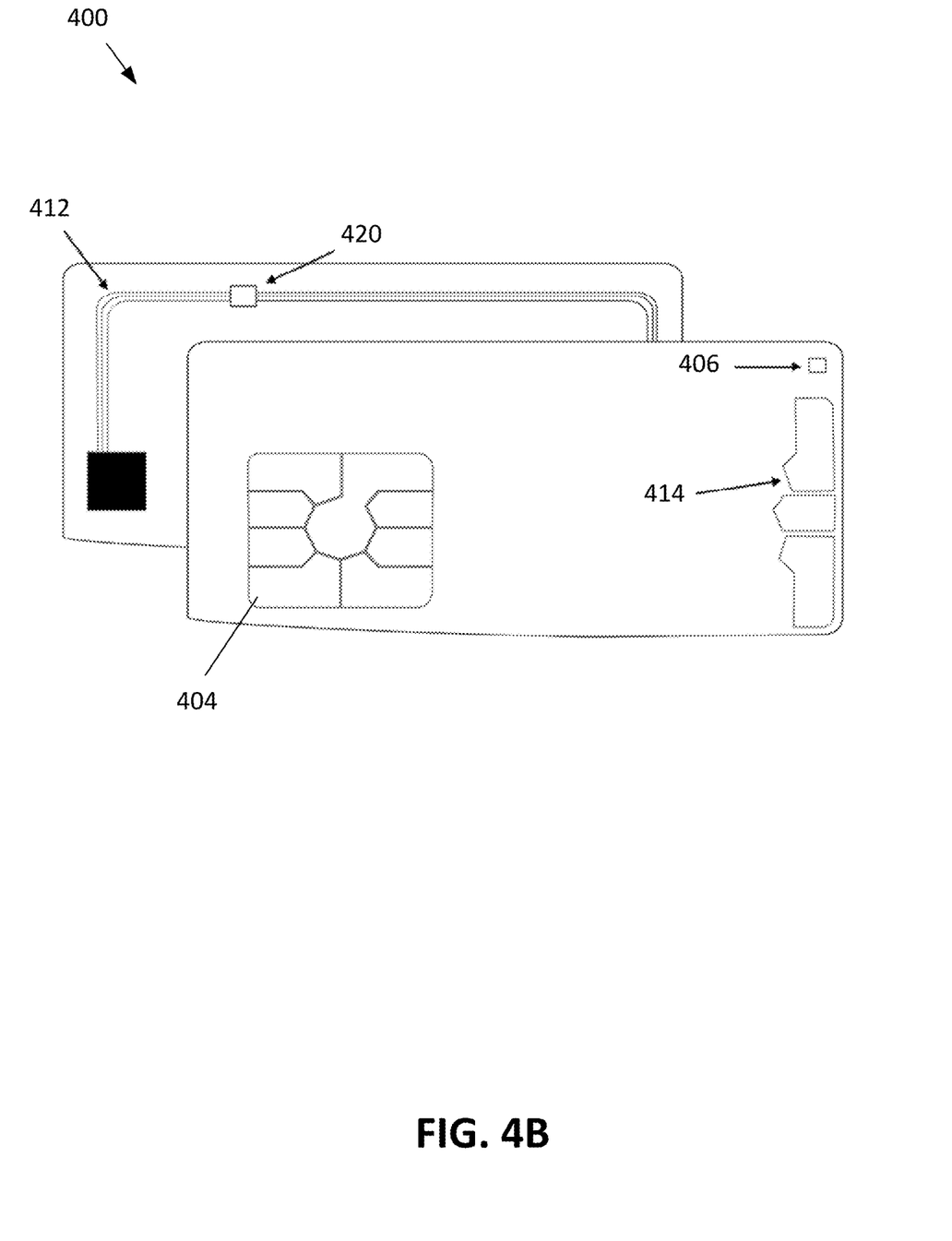

FIGS. 4A and 4B illustrate features of a split transaction payment instrument 400 according to an embodiment of the present disclosure. FIGS. 4A and 4B illustrate split transaction payment instrument 400 that is of a credit card and/or debit card form factor. Split transaction payment instrument 400 may include a body 402, a chip 404, indicator 406, antenna 412, secondary contacts 414, and processor 420. The processor 420 may include a secure element for processing of transactions. The split transaction payment instrument 400 may be configured to process split transactions by detecting when one or more other split transaction payment instruments are disposed proximate to the split transaction payment instrument 400.

For example, antenna 412 may be configured to communicate with other payment instruments disposed proximate the split transaction payment instrument 400. Once the split transaction payment instrument 400 detects and communicates with the other payment instrument disposed proximately, the split transaction payment instrument 400 may accordingly provide the payment accounts associated with such payment instruments to a merchant device and, thus, process a split transaction with the various payment accounts of the split transaction payment instrument 400 and the other payment instruments. Antenna 412 may be configured to communicate through a short-range communications standard such as Bluetooth, NFC, RFID, and/or another appropriate short range communications standard.

Secondary contacts 414 may also allow the split transaction payment instrument 400 to communicate with other payment instruments. In certain embodiments, the secondary contacts 414 may be another portion of the antenna 412. In certain other embodiments, secondary contacts 414 may be configured to receive user inputs (e.g., similar to a button). Thus, a user may place the split transaction payment instrument 400 into a split transaction mode by contacting or pressing one or more of secondary contacts 414. Such a mode may, in certain embodiments, be activated when the split transaction payment instrument 400 is coupled to a point of sale device.

Additionally or alternatively, the secondary contacts 414 may be configured to electrically couple with the chips of other payment instruments. For example, the chips of other payment instruments may contact the secondary contacts 414. Upon contact, data may be communicated to the split transaction payment instrument 400 identifying the payment instrument or account associated with the payment instrument. The split transaction payment instrument 400 may then process a split transaction accordingly.

In certain embodiments, the other payment instrument may first contact the secondary contacts 414 before the transaction and the data identifying the other payment instrument may be stored for a later transaction. In other embodiments, the split transaction payment instrument 400 may first engage a merchant device. Upon engagement, the chips of other payment instruments (whether a split transaction payment instrument or a traditional payment instrument) may contact or be disposed proximate to the secondary contacts 414 to conduct a split transaction. Accordingly, the split transaction payment instrument 400 may be configured to engage in split transactions with both contact and contactless payment instruments.

Figure 4C:
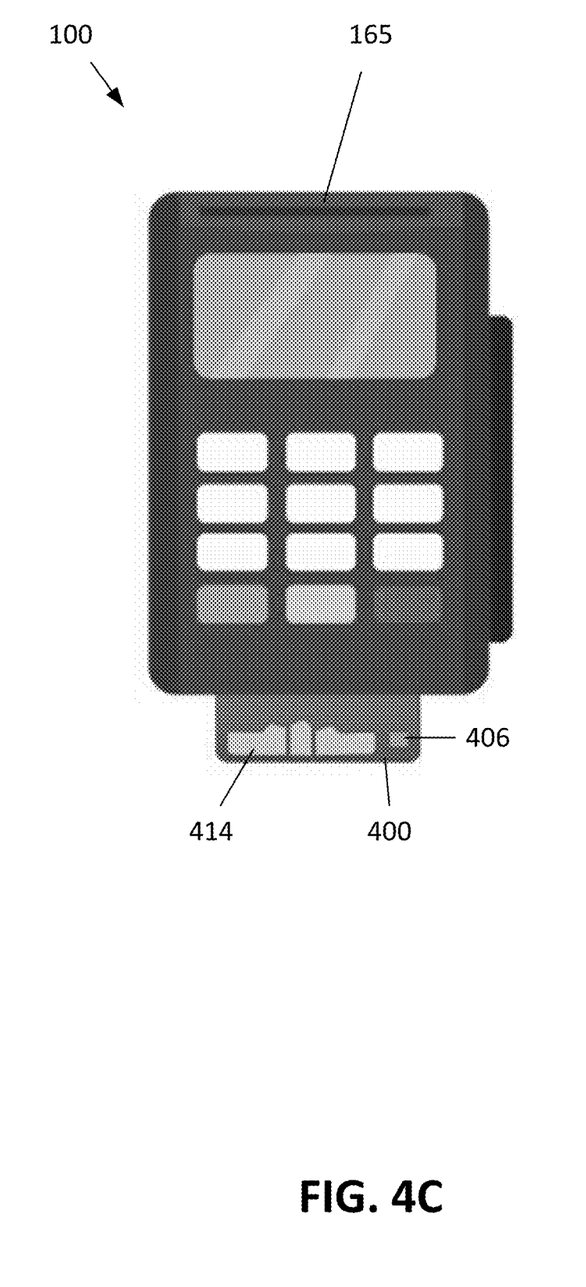
FIG. 4C illustrates a point of sale device and a split transaction payment instrument according to an embodiment of the present disclosure.

FIG. 4C illustrates a point of sale device and a split transaction payment instrument according to an embodiment of the present disclosure. FIG. 4C illustrates split transaction payment instrument 400 coupled to point of sale device 165. When coupled to the point of sale device 165, the secondary contacts 414 of split transaction payment instrument 400 is still exposed and, thus, can still receive data wirelessly or through contact from another payment instrument. Indicator 406 may indicate to the user whether the split transaction payment instrument 500 is conducting a split transaction.

In certain embodiments, the point of sale device 165 may be configured to allow a user to confirm a transaction. The point of sale device 165 may ask the user to confirm whether all payment instruments have been added to the transaction. Thus, during processing of the transaction with the point of sale device 165, the user of the split transaction payment instrument 400 may have the opportunity to add more payment instruments for processing by indicating that more payment instruments will be added. In certain embodiments, the point of sale device 165 may be configured to list all payment instruments of the split transaction on, for example, a user interface.

Figure 5:
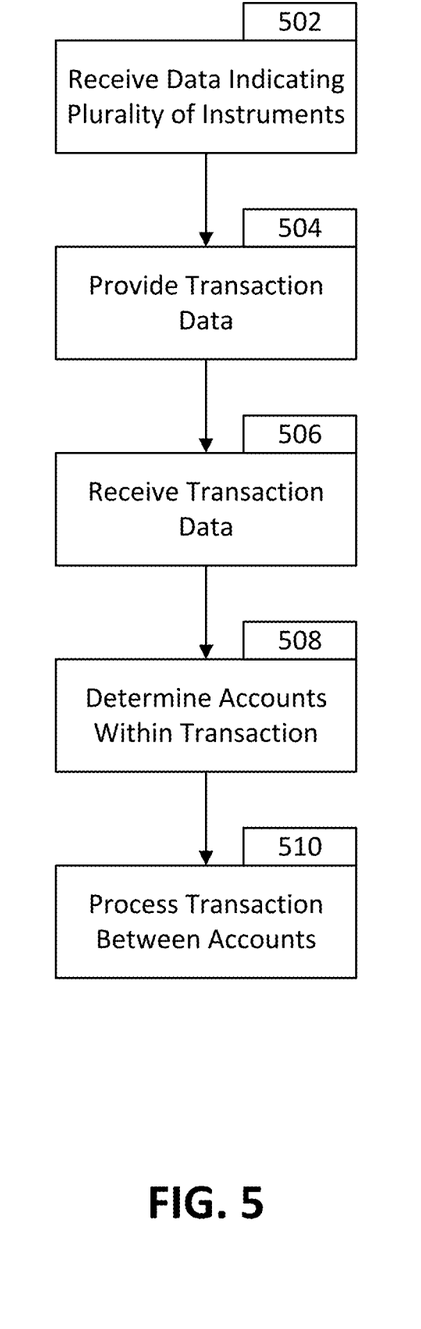
FIG. 5 is a flowchart detailing a transaction processed with split transaction payment instruments according to an embodiment of the present disclosure.

FIG. 5 is a flowchart detailing a transaction processed with split transaction payment instruments according to an embodiment of the present disclosure. Steps 502 and 504 of the process of FIG. 5 may be performed by a point of sale device. Steps 506-510 of the process may be performed by the service provider.

In step 502, the point of sale device may receive a split transaction payment instrument. The split transaction payment instrument may include stored data indicating that the split transaction payment instrument includes data identifying a plurality of payment instruments and that the transaction should be a split transaction. In other embodiments, the split transaction payment instrument may interact with other payment instruments (e.g., receive data wirelessly or through contact with other payment instruments) while the transaction with the point of sale device is being processed.

For example, in certain embodiments, the split transaction payment instrument may not be powered until coupled to the point of sale device. Once powered, the split transaction payment instrument may interact with other payment instruments to conduct a split transaction. Upon interacting with the other payment instruments, the split transaction payment instrument may indicate to the point of sale device that the transaction is a split transaction.

In step 504, transaction data may be provided from the point of sale device to the service provider. The transaction data may indicate that the transaction is a split transaction. In certain embodiments, the transaction data may identify all of the payment instruments of the split transaction. In certain such embodiments, the transaction data may be received from the split transaction payment instrument and provided to the service provider without manipulation by the point of sale device. The transaction data may identify the payment instruments through a format understandable by the service provider issuing the split transaction payment instrument. The split transaction payment instrument may receive, for example, the account numbers of the other payment instruments and convert the account numbers to the format. The converted account numbers may then be provided to the service provider.

In step 506, the service provider may receive the transaction data from the point of sale device. The service provider may then determine, from the transaction data, that the transaction is a split transaction. Accordingly, in step 508, the service provider may determine all payment instruments and/or accounts involved within the split transaction from the transaction data. In certain embodiments, the service provider may determine the account numbers of the payment instrument from converted account numbers provided by the split transaction payment instrument.

Accordingly, in embodiments with stacked split transaction payment instruments (e.g., where portions of a plurality of payment instruments are stacked for a split transaction), an application on a card reader terminal (e.g., of a point of sale device) may gather the account numbers of the additional payment instruments by enumerating the smart elements contained in each stacked module via their physical electric connection. The individual stacked modules may be configured to respond to the payment application of the card reader terminal after enumeration of the smart elements by sending account data (which may or may not be encrypted) of each module. In certain embodiments, each stacked module may send the data in sequence (e.g., the split payment transaction instrument may first send data, then a first stacked module may send data, and then a second stacked module may send data, or vice versa). In certain embodiments, as the sequence completes, the LED present on each module would change color to indicate completion (or failure) of sending the data. The additional account data contained in the transaction data (e.g., the account data that indicates more than one account would be used for the transaction) may be indicated by using a flag in the transaction header communicated to the service provider to denote a split transaction. In other embodiments, a previously unused field may include a flag indicating a split transaction that would then trigger the processing of a split transaction by the service provider.

In embodiments utilizing a segment-less card (e.g., a card that indicates split transactions through wireless communicated or through chip contact), a similar process may be used. In such an embodiment, the enumeration of additional secure elements may be manually and interactively controlled by the contacts acting as buttons to indicate a user's wish to start the enumeration process to split a transaction. The secure elements of the various payment instruments of the split transaction may then communicate over a close-proximity communication channel (e.g., wirelessly) or through electrical contact.

In step 510, the service provider may process the transaction by debiting all of the payment instruments and/or payment accounts associated with the transaction. The service provider may also determine a ratio of splitting between the payment instruments and/or accounts. In certain transactions where no split percentage is indicated, the transaction may be split evenly between all payment instruments and/or accounts. In other embodiments, the split transaction payment instrument and/or the point of sale device may receive input from the user indicating the percentage split of each payment instrument or a default split may be set by the user of the split transaction payment instrument. In such an embodiment, the service provider may accordingly split the transaction between the payment instruments and/or accounts.

In certain embodiments, the service provider may not be the account provider for all of the payment instruments. As such, in order to increase transaction processing speeds, the service provider may first provide payment for the transaction and then debit the other account providers for the shares of the other payment instruments. In other embodiments, the service provider may not provide payment for all of the transactions upfront and the transaction may not be processed until the service provider receives payment from the other account providers.

Once payment is provided, the service provider may indicate to the merchant that the transaction has been processed. The transaction may be finished (e.g., by the merchant providing the goods or services to the customer).

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing first payment data associated with a user payment account associated with a split transaction payment instrument, wherein the split transaction payment instrument comprises circuitry configured to communicatively couple to one or more external payment instruments, wherein the split transaction payment instrument further comprises a first portion, a second portion, and a receptacle configured to receive the one or more external payment instruments, wherein the circuitry comprises a first contact disposed within the receptacle, wherein the receptacle is disposed within the second portion on a first end of the second portion, and wherein the second portion further comprises a tab disposed on a second end of the second portion and configured to couple to one or more receptacles of the one or more external payment instruments; and
one or more hardware processors coupled to the non-transitory memory and configured to read instructions to cause the system to perform operations comprising:
determining that a first external payment instrument is communicatively coupled to the split transaction payment instrument, wherein the communicatively coupling comprises the first contact electrically connecting to an electrical circuit of the first external payment instrument;
determining, based on the communicative coupling, a first payment account associated with the first external payment instrument;
determining that a split transaction is to be conducted with at least the user payment account and the first external payment instrument;
providing, to a merchant device, an indication of the split transaction; and
providing, to the merchant device, transaction data associated with the user payment account and the first payment account.

2. The system of claim 1, wherein operations further comprise:
determining that a second external payment instrument is communicatively coupled to the split transaction payment instrument; and
determining, based on the communicative coupling, a second payment account associated with the second external payment instrument, wherein the transaction data is further associated with the second payment account.

3. The system of claim 1, wherein the circuitry comprises an antenna, and wherein the communicatively coupling further comprises wireless communication.

4. The system of claim 1, wherein the tab comprises a second contact and the second contact is configured to electrically connect to the first contact when the tab is coupled to the receptacle of the one or more external payment instruments.

5. The system of claim 4, wherein the communicative coupling further comprises the second contact electrically connecting to the first contact.

6. The system of claim 1, wherein the second portion is configured to couple to a plurality of stacked other second portions, wherein each tab of the plurality of stacked other second portions couples with a corresponding receptacle of the second portion or another one the plurality of stacked other second portions.

7. The system of claim 1, wherein the split transaction payment instrument further comprises an EMV chip.

8. The system of claim 1, wherein the circuitry comprises a secondary contact disposed on a surface of the split transaction payment instrument, and wherein the communicative coupling further comprises the secondary contact electrically coupling to an electrical circuit of the external payment instrument.

9. The system of claim 1, wherein the operations further comprise:
determining that the split transaction payment instrument is communicatively coupled to a merchant device, wherein the providing the indication of the split transaction is provided based on the determining that the split transaction payment instrument is communicatively coupled to the merchant device.

10. The system of claim 1, wherein the split transaction payment instrument further comprises an indicator configured to display when the split transaction payment instrument is conducting the split transaction.

11. The system of claim 1, wherein the transaction data comprises account data associated with at least one of the user payment account and the first payment account in a proprietary data format for a service provider associated with the split transaction payment instrument, and wherein the account data in the proprietary data format identifies the service provider for a communication of the transaction data for processing.

12. A method comprising:
receiving transaction data associated with a transaction from a merchant device wherein the transaction data is generated by a split transaction payment instrument based on the split transaction payment instrument determining that a first external payment instrument is communicatively coupled to the split transaction payment instrument, wherein the split transaction payment instrument comprises a first portion, a second portion, and a receptacle configured to receive the first external payment instrument, wherein circuitry of the split transaction payment instrument comprises a first contact disposed within the receptacle, wherein the receptacle is disposed within the second portion on a first end of the second portion, and wherein the second portion further comprises a tab disposed on a second end of the second portion and configured to couple to a receptacles of the first external payment instrument;
determining, from the transaction data, that the transaction is a split transaction;
determining, from the transaction data, a first payment account and a second payment account; and
processing the transaction with the first payment account and the second payment account.

13. The method of claim 12, wherein the split transaction payment instrument is coupled to the merchant device to provide the transaction data to the merchant device.

14. The method of claim 12, wherein the communicatively coupling comprises the split transaction payment instrument wirelessly communicating with and/or electrically connecting to an external payment instrument.

15. The method of claim 12, further comprising:
determining that the first payment account is maintained by a first account provider and determining that the second payment account is maintained by a second account provider; and
processing the transaction by debiting both the first account provider and the second account provider.

16. The method of claim 12, further comprising:
determining a ratio of splitting between the first payment account and the second payment account, wherein the transaction is processed according to the ratio of splitting.

17. The method of claim 12, wherein the transaction data comprises account data associated with at least one of the first payment account and the second payment account in a proprietary data format for a service provider associated with the split transaction payment instrument, and wherein the account data in the proprietary data format identifies the service provider for a communication of the transaction data for processing.

18. A non-transitory machine-readable medium having stored thereon machine-readable instructions executable to cause a machine to perform operations comprising:
determining that a first external payment instrument is communicatively coupled to a split transaction payment instrument comprising a first portion, a second portion, and a receptacle configured to receive one or more external payment instruments and disposed within the second portion, wherein circuitry of the split transaction payment instrument comprises a first contact disposed within the receptacle, wherein the second portion is configured to couple to a plurality of stacked other second portions that each couple with a corresponding receptacle of the second portion or another one of the plurality of stacked other second portions, wherein the split transaction payment instrument is associated with a user payment account, and wherein the communicatively coupling comprises the first contact electrically connecting to an electrical circuit of the first external payment instrument;
determining, based on the communicative coupling, a first payment account associated with the first external payment instrument;
determining that a split transaction is to be conducted with at least the user payment account and the first external payment instrument;
providing, to a merchant device, an indication of the split transaction; and
providing, to the merchant device, transaction data associated with the user payment account and the first payment account.

19. The non-transitory machine-readable medium of claim 18, wherein the operations further comprise:
determining that a second external payment instrument is communicatively coupled to the split transaction payment instrument; and
determining, based on the communicative coupling, a second payment account associated with the second external payment instrument, wherein the transaction data is further associated with the second payment account.

20. The non-transitory machine-readable medium of claim 18, wherein the transaction data comprises account data associated with at least one of the user payment account and the first payment account in a proprietary data format for a service provider associated with the split transaction payment instrument, and wherein the account data in the proprietary data format identifies the service provider for a communication of the transaction data for processing.

* * * * *